Sept. 7, 1954  R. B. BUCHNER  2,688,659
CIRCUIT-ARRANGEMENT FOR USE IN AUTOMATIC SIGNALING
SYSTEMS FOR NUMERICAL ADJUSTMENT OF A SWITCH
BY A SELECTIVE MARKING METHOD
Filed Oct. 21, 1950

*INVENTOR.*
ROBERT B. BUCHNER
BY
AGENT

Patented Sept. 7, 1954

2,688,659

UNITED STATES PATENT OFFICE 2,688,659

CIRCUIT-ARRANGEMENT FOR USE IN AUTOMATIC SIGNALING SYSTEMS FOR NUMERICAL ADJUSTMENT OF A SWITCH BY A SELECTIVE MARKING METHOD

Robert Bertold Buchner, Hilversum, Netherlands, assignor to Hartford National Bank and Trust Company, Hartford, Conn., as trustee Application October 21, 1950, Serial No. 191,337

Claims priority, application Netherlands October 31, 1949

2 Claims. (Cl. 179—18)

This invention relates to circuit-arrangements, for use in automatic signalling systems, for the numerical adjustment of a selector switch such as a final selector, according to a double, numerical criterion.

Circuit-arrangements are known in which the marking contacts of selector switches are numerically marked by characteristic indications, such as direct voltages of different values, alternating voltages of different amplitudes, phases or frequencies, or impedances of different values. The adjustment of the switch is controlled by means of a control device, which compares the characteristic indications of the marking contacts successively struck by a wiper of the switch with a comparison value which is preadjusted in the register by dial signals. The control device stops the movement of the switch as soon as an outlet is found, the electric indication of which is in a certain proportion to, for example equal to the comparison value in the register.

Such a method of adjusting a switch is referred to by the term "selective marking method."

In a known circuit-arrangement of this kind, the outlets of final selectors are marked by a combination of two electrical indications. For this purpose a first electrical indication, which is an indication of the decade of the outlet, is associated with a first marking contact of each outlet, a second marking contact of each outlet being a second electrical indication, which is characteristic of the unity of the outlet. During movement of the switch, the control device tests the said indications simultaneously by way of the two wipers moving over the first and second marking contacts and stops the switch as soon as an outlet is found which exhibits the combination of electrical indications corresponding to the outlet desired.

The double marking has the advantage that the adjustment takes place in a single movement instead of in two movements, as is the case in other arrangements, i. e. at first an adjustment to the decade corresponding to the desired outlet and then the choice of the desired unity within the decade. A very important result thereof is that a given number is not bound to a given area on the contact bank, so that for example P. B. X lines may be connected to any arbitrary outlets which need not necessarily be located within a given decade.

The known circuit-arrangement is limited in that the double marking is obtained at the expense of an additional marking arc with a wiper on the switch. In the arrangement according to the invention, the double marking takes place on one and the same marking contact of each outlet.

The invention is characterized in that the two indications are realized respectively as the electromotive force, i. e. the terminal voltage in the absence of test current, and the internal resistance of the outlet circuit connected to a marking contact, the control device comprising electronic means for testing successively the two characteristic indications of the outlets. The control device is preferably so constructed that it comprises an electronic trigger which may occupy two different, electrically stable positions and is provided with at least one discharge tube, one discharge path of which is connected to the wiper of the switch. At the beginning of the test, the trigger occupies the first electrical position, in which the tube is cut off and substantially no current flows through the wiper, so that the voltage across this wiper equals the electromotive force of the outlet marking circuit.

At this stage, the voltage across the wiper is tested by means of a voltage-comparison device, which constitutes part of the control device. If this voltage is found to correspond with that of the outlet desired, the voltage-comparison device responds, so that the trigger is moved into the second electrical position. In this position, the tube is conducting, so that test current flows through the outlet marking circuit. At this second stage, the internal resistance of the outlet circuit is compared in a voltage or current bridge, with a comparison resistance in the register.

Since the resistance test circuit is switched on only if the correct voltage is found across the marking contact, the response of the resistance test device, upon finding the correct resistance, shows the presence of the combination of indications corresponding to the outlet desired.

If the desired resistance is not found, the switch turns on and the trigger is automatically moved into the first electrical position upon changeover of the wiper to the subsequent marking contact, the current passing through the tube then being interrupted.

In the copending U. S. patent application Ser. No. 107,411, filed July 29, 1949, a voltage-comparison device has already been suggested, which is particularly suitable for the purpose in view.

The trigger circuit may comprise a gas-filled tube. As an alternative, use may be made with advantage of a trigger circuit comprising two vacuum tubes which are connected so as to cut off one another.

Such a trigger circuit is used in combination with a voltage-comparison device in control devices as described in the copending U. S. patent application Ser. No. 107,412, filed July 29, 1949, now issued as Patent No. 2,640,883, dated June 2, 1953, and Ser. No. 163,170 filed May 20, 1950, and which permit of adjusting a switch by means of a single selective criterion.

In the circuit-arrangement according to the above-mentioned copending application Ser. No. 107,411, the voltage-comparison device tests the selective criteria, which are characteristic of the figure coresponding to the outlets. If the switch finds an outlet corresponding to the desired figure, the comparison device supplies to the trigger a voltage such that it passes from the first electrical condition into the second, if the outlet is free, but remains in the first electrical condition if the outlet is busy. The passage of the trigger to the second electrical condition provides the indication that a desired free outlet is reached. In the second electrical condition, a current flows through the wiper of the switch and through the outlet circuit connected to the marking contact such that the outlet is engaged. The value of resistances connected to marking contacts is not tested in this arrangement.

The above-mentioned copending application Ser. No. 163,170 describes a number of circuits for adjusting a switch to an outlet numerically marked by a resistance of characteristic value. The circiut comprises a trigger which passes into the second electrical position at each free outlet and which causes a test current to flow through the characteristic resistance connected to a marking contact, whereafter this resistance is tested. In some of these circuits, one tube of the trigger is connected between a wiper of the switch and a wiper of a marking switch in the register, this wiper switching on numerical comparison resistances, while a voltage comparison device tests the potential of a tap on a potentiometer shunting the tube.

In order that the invention may be more clearly understood and readily carried into effect, it will now be described in detail with reference to the accompanying drawing, wherein.

The various figures only show those parts which are required for proper understanding of the invention.

Figure 1:
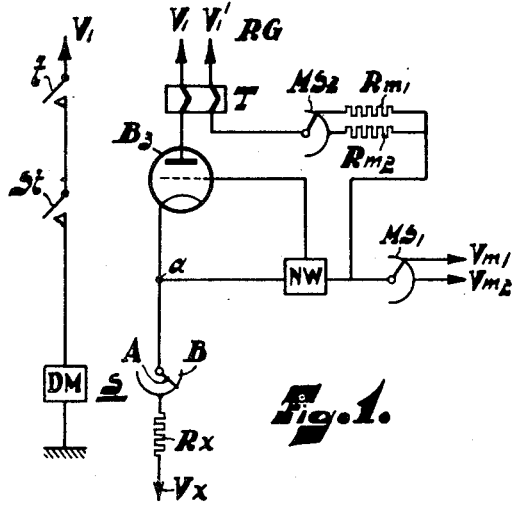
Fig. 1 shows a circuit-arrangement in which the test current required for testing the resistances is switched on by means of a gas-filled tube. Here the resistance test takes place in a current bridge.

Referring to Fig. 1, S designates a final selector, of which only the wiper A, the contact-bank B wiped thereby and the rotary magnet BM are shown. The marking contacts are connected through resistances $Rx$ to the voltage sources $Vx$. The values of the voltages $Vx$ provide an indication of the decade of the outlet corresponding to each marking contact, the values of the resistances $Rx$ being characteristic of the unit of the outlet. Thus, the voltages $Vx$ are relatively equal for the outlets 11, 12, 13 and so forth of the final selector, but are different from the voltages of the outlets 22, 31, 32 and so forth, the resistances $Rx$ of the outlets 11, 21, 31, 41 and so forth being relatively equal, but different from the resistances of the outlets 12, 22, and so forth. The register RG comprises two marking switches MS1 and MS2, which are adjusted in accordance with the penultimate and the last dialling pulse series respectively emitted by a subscriber.

The outlets of MS1 are connected to sources $Vm_1$, $Vm_2$, etc., the voltages of which equal those of the numerically corresponding marking contacts of the final selector S. For example, if the penultimate number chosen by a subscriber is 3, the wiper of marking switch MS1 moves towards the third contact, the voltage of which equals the identification voltage, so that the marking contacts of the third decade of the final selector are characterized. Similarly, the marking contacts of the marking switch MS2 are connected to the resistances $Rm_1$ $Rm_2$ and so forth (which are individually identical with those of the identification resistances $Rx$, which characterize the unit figure of the outlets of final selector S. The other side of the resistances are connected in common to the wiper of marking switch MS1.

During the adjustment of the selector, the wiper A is connected to a point $a$ in the register. Connected between point $a$ and the wiper of the marking switch MS1 is a voltage-comparison circuit NW of high impedance, which compares the potentials of point $a$ with those of the wiper of marking switch MS1.

The voltage-comparison device may be, with advantage, of the kind described in the copending application Ser. No. 107,411. Between point $a$ and a voltage source $V_1$ is connected, in series with a winding of the test differential relay T, a gas-filled tube $B_3$. The second winding of the relay T is connected between a source $V_1{}^1$ and the wiper of the marking switch MS2. The control grid of the tube B is connected to a point of a voltage-comparison device NW.

The circuit-arrangement operates as follows:

The gas-filled tube $B_3$ is initially cut off; current flowing only through the right-hand winding of the relay T, so that the latter is energized and make contact $t$ is closed.

By closing the contact St, the rotary magnet DM of the final selector is energized and the switch actuated. As soon os the wiper A strikes a marking contact, the device NW tests the voltage at the point $a$. Since the gas-filled tube $B_3$ is cut off and the internal resistance of the voltage-comparison device NW is very high, substantially no current flows through the identification resistance $Rx$, so that the voltage of point $a$ is equal to $Vx$.

If the voltage of point $a$ is different from the voltage $Vm$ of the contact of the marking switch MS1, on which the switch rests, i. e. if the outlet being tested is not associated with the desired decade, the device NW does not respond and the selector moves on. However, if an outlet is found corresponding to the desired decade, the voltage of point $a$ equals the marking voltage $Vm$ and the device NW responds, with the result that an output voltage is supplied to the grid of the gas-filled tube $B_3$ such that this tube ignites and a test current flows through the resistance $Rx$ and the left-hand winding of the relay T. Although, under the action of the current flowing through the resistance $Rx$, the voltage of point $a$ now varies and the device NW finds the voltages to be different, so that the voltage at the control grid of tube $B_3$ is again reduced, the tube remains conducting.

The operating voltage of the gas-filled tube is substantially independent of the value of this current and the voltage $V_1'$ is lower by an equal value than the voltage $V_1$. Consequently, if the tested resistance $Rx$ and the comparison resistance $Rm$ are equal, the windings of relay T are traversed by equal currents.

In this case, the relay T is de-energized and its make contact $t$ opens, so that the energizing circuit of the rotary magnet DM is opened and the selector stops. However, if the resistances $Rx$ and $Rm$ are different, relay T remains energized and the selector moves on. During the changeover of the wiper to the subsequent contact, the current circuit of tube $B_3$ is interrupted for a short period and the tube extinguishes. The double test is repeated at the subsequent marking contact. It will be obvious that in this arrangement the resistance can be tested only, if the voltage test has given the correct result. From the fact that during the resistance test the presence of a numerically correct resistance is found it thus follows automatically that the identification voltage also has the required value.

Figure 2:
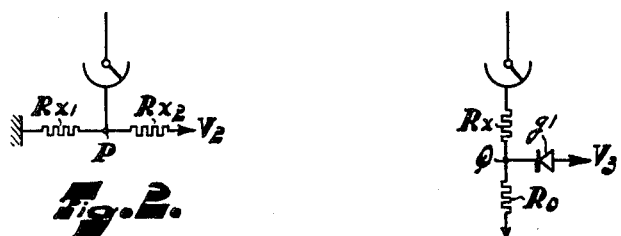
Figs. 2 and 3 show two types of outlet arrangements.

Fig. 2 shows a variety of the outlet marking circuit of Fig. 1. Here the marking contacts are connected to a tap P on a potentiometer $Rx_1$, $Rx_2$, connected between two points of constant potential. The outlet circuits are completely equivalent in electrical respect, if point P is chosen to be such that the voltage of point P is equal to $Vx$, if no current flows through the marking contact and if, furthermore, the value of the parallel combination of $Rx_1$ and $Rx_2$ is equal to $Rx$. The arrangement shown in Fig. 2 has the advantage that the voltage sources $Vx$ need not be multiplied throughout the exchange, so that the possibility of relative interference of different selectors is reduced. The current path through the potentiometer may, for example, be switched on in known manner by way of a relay contact of the selector.

Figure 3:
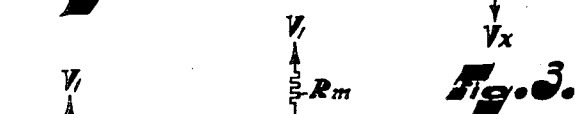

Another form of the outlet circuit is shown in Fig. 3. The outlet marking contacts are connected through the identification resistances $Rx$, the values of which are characteristic of the unity of the outlets, to points Q. The points Q are connected, on the one hand, through a resistance $Rx$, to sources of characteristic voltages $Vx$ and, on the other hand, through a rectifier $g_1$, to sources of constant voltage $V_3$.

The indications may be tested with the use of an arrangement similar to that shown in Fig. 1. During the test of the voltage, no current flows through the wiper. The rectifier $g_1$ is then cut off and the potential of the wiper is equal to $Vx$.

If the device NW finds the presence of a desired voltage $Vx$, the gas-filled tube ignites, with the result that a current begins to flow through the resistance $Rx$ such that the voltage of point Q increases to the value $V_3$ and the rectifier $g_1$ becomes conducting. During the resistance test, the end of $Rx$ remote from the marking contact consequently has the constant voltage $V_3$ and not as in the case in the arrangement shown in Fig. 1, a voltage $Vx$, which is different for different decades. Hence the common end of the control resistances $Rm$ in the comparison branch, instead of being connected to the wiper of marking switch MS1, must be connected through the right-hand winding of relay T to a source of constant voltage.

It is obvious that the voltage $Vx$ may also be derived with the use of a potentiometer circuit, as shown in Fig. 2. In this case the resistance $R_0$ may be dispensed with.

The use of gas-filled tubes has various disadvantages. Thus, for example, it may occur that, if in the arrangement shown in Fig. 1, the tube does not extinguish completely, an ion concentration subsists upon passage of the wiper to a subsequent contact such that the tube again ignites without an ignition voltage being supplied by the device NW.

Figure 4:
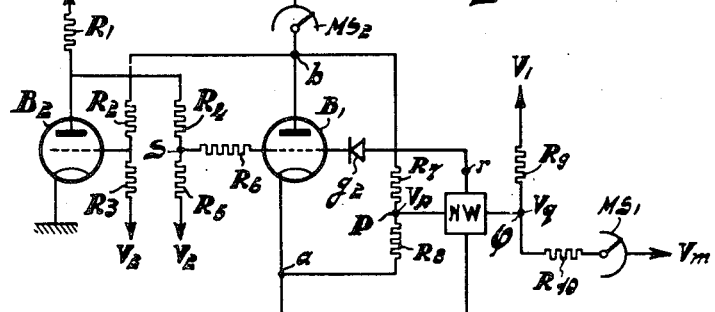
Fig. 4 is a circuit-arrangement in which use is made of a trigger circuit comprising two vacuum tubes for switching on the test current. Here the characteristic resistance is tested by means of a Wheatstone bridge.

Consequently, the test current for the resistance test is preferably switched on by means of vacuum tubes. Such an arrangement is shown in Fig. 4.

The outlet circuit of the selector is arranged in a manner similar to that shown in Fig. 1. MS1 and MS2 again designate the register marking switches. The control device comprises two vacuum tubes $B_1$ and $B_2$, which are included in a trigger circuit. The cathode of tube $B_1$ is connected, during adjustment, to the wiper of the selector S. The control grid of $B_1$ is connected through a high resistance $R_6$ to a tap on a potentiometer $R_4$, $R_5$, connected between the anode of tube $B_2$ and the voltage source $V_2$. The control grid of $B_2$ is connected to a tap on the potentiometer $R_2$, $R_3$, which is connected between the anode of tube $B_1$ and the source $V_2$.

The anode of $B_2$ is fed through the resistance $R_1$ by the voltage source $V_1$, the cathode of $B_2$ being connected to earth. The anode of tube $B_1$ is connected to the wiper of the register marking switch MS2.

The coupling between the tubes $B_1$ and $B_2$ is such that, if one tube is conducting, the other tube acquires a grid voltage such that it is cut off. The resistance value of the potentiometer $R_2$, $R_3$ is high with respect to the highest resistances $Rm$. The anode-cathode space of tube $B_1$ is shunted by a potentiometer $R_7$, $R_8$. The point P divides the potentiometer $R_7$, $R_8$ into two parts which are in the same proportion to one another as the numerically corresponding values of resistances $Rm$ and $Rx$. Consequently, if resistances $Rm$ and $Rx$, associated with each other, are equal, point P lies at the centre of the potentiometer. The voltage-comparison device NW compares the potential of point P with that of the tap Q on the potentiometer $R_9$, $R_{10}$, which is connected between the voltage source $V_1$ and the wiper of the marking switch MS1. A point $r$ of an output circuit of the device NW is coupled through a rectifier $g_2$ to the control-grid of tube $B_1$. The rectifier has a polarity such that the control-grid of tube $B_1$ follows the higher of the potentials of the point $r$ and the point $s$ on the potentiometer $R_4$, $R_5$. The rotary magnet DM of the selector is locked by the device NW, which may, for example, be constructed as described in the copending U. S. application Ser. No. 107,411.

At the beginning of a test on a marking contact, the trigger $B_1$, $B_2$ occupies an electrically stable position, in which tube $B_1$ is cut off and tube $B_2$ is conducting. The resistances $R_7$ and $R_8$ have high values with respect to the higher of the resistances $Rm$ and $Rx$, so that in this position substantially no current flows through resistance $Rx$ and the voltage at point $a$ is substantially equal to $Vx$ and the voltage at point $b$ is substantially equal to $V_1$. The potential of point P is then equal to:

$$V_p = \tfrac{1}{2}(V_1 + Vx)$$

and the potential of point Q is equal to $$V_q = \tfrac{1}{2}(V_1 + Vm)$$

The device NW, when the wiper of the switch wipes a marking contact, compares the potentials of points P and Q.

If the voltages $Vm$ and $Vx$ are different, i. e. if the outlet being tested does not belong to the decade desired, the voltages $V_p$ and $V_q$ are also different and the device NW does not respond, the selector then turning on.

However, if the voltages $V_p$ and $V_q$ become equal to each other, the device NW produces at its output point $r$ a voltage such that the rectifier $g_2$ becomes conducting and the control-grid of $B_1$ acquires a potential at which tube $B_1$ is opened.

The potential of the anode of $B_1$ and hence the potential of the control-grid of tube $B_2$ decreases, so that this tube is cut off, which results in that point $s$ assumes a comparatively high potential. The trigger circuit has then passed into its second, electrically stable position, in which a test current $I$ flows through the resistance $Rx$, the discharge path of tube $B_1$ and the resistance $Rm$.

The potential of point P is now equal to:

$$V_p = \tfrac{1}{2}(V_1 + Vx) + \tfrac{1}{2} I (Rx - Rm)$$

Since the voltage of point Q is equal to:

$$V_q = \tfrac{1}{2}(V_1 + Vm) = \tfrac{1}{2}(V_1 + Vx)$$

the potential difference between points P and Q is equal to:

$$V_p - V_q = \tfrac{1}{2} I (Rx - Rm)$$

If the resistances $Rx$ and $Rm$ are different, the device NW finds the voltages of points P and Q, to be different immediately after the trigger circuit has passed to its second electrically stable condition. In this case the device NW, after the wiper of the selector has struck a marking contact, has remained in a condition in which voltage equality occurs, for a period of a few microseconds only. This period is too short to de-energize the relay of the device NW (not shown), which has to interrupt the energizing circuit of the rotary magnet DM, so that the selector turns on.

The trigger remains in the second electrical condition despite the fact that the device NW is in a condition in which the voltage of point $r$ is comparatively low, since the control-grid of $B_1$ follows the higher of the potentials of the point $s$ and $r$ and point $s$ has a comparatively high potential.

Upon passage of the wiper to a subsequent contact, the circuit through tube $B_1$ is opened so that this tube is cut off and tube $B_2$ is conducting. The trigger thus returns to its first electrical condition.

If a desired outlet is found, the voltages of the points P and Q remain equal after the trigger has passed into the second electrically stable condition, since the resistances $Rm$ and $Rx$ are now equal. The device NW thus remains responsive for a longer period. The rotary magnet DM is now demagnetized and the selector stops.

Then, or, if desired, during the test of the numerical criteria, it is tested whether the outlet is free.

The outlets may be marked as engaged by connecting the marking contacts to a point of constant voltage, for example, earth. Since, thus, the numerical identification voltage is withdrawn, the selector does not stop on an engaged outlet. The fact that the desired outlet is engaged, then follows from the continued rotation of the selector, which may, for example, be ascertained with the use of a time-limiting circuit. This method has the advantage that a separate wiper is not required. There is, however, a disadvantage in that the operator cannot change-over to an engaged outlet for establishing a trunk connection.

As a matter of course, the engagement marking may also be effected in known manner by way of separate marking contacts, in which case the said disadvantage does not occur.

Regarding the manner in which the voltage comparison device disclosed in the above-identified Patent 2,640,883 may be substituted for element NW in Fig. 1, it is pointed out that in said patent the single figure in the drawing shows the circuit of a voltage comparsion device OI provided with voltage input terminals 2 and 4 and an output terminal 14. Input terminals 2 and 4 may be connected to the wipers of marking switch $MS_1$ and selector switch S, respectively, in Fig. 1, while output terminal 14 may be connected to the grid of tube $B_3$ in Fig. 1. Thus the difference voltage developed at output terminal 14 controls conduction in tube $B_3$.

Regarding the manner of effecting a similar substitution in Fig. 4, input terminals 2 and 4 of voltage comparison device OI may be connected to points $V_g$ and $V_p$, respectively. To effect control of electromagnet DM in Fig. 4, one may use the voltage yielded at output terminal 14 to operate the control system BI shown in said patent and apply the output of said control system to electromagnet DM in Fig. 4 in lieu of electromagnet SM in the patent. To effect control of conduction in tube $B_1$ in the patent, the control voltage yielded at terminal 14 in the device OI or at some other point in the output potentiometer $R_{15}$ may be applied to terminal $r$ in Fig. 4.

What I claim is:

1. In an automatic signalling system, a circuit arrangement for the numerical adjustment by selective marking of a selector switch with simple motion, said switch having a wiper for successively engaging a plurality of outlets each having a marking contact and a mechanism for actuating said wiper, an outlet circuit coupled to each marking contact and including a voltage supply connected to said marking contact through a resistance, said outlet circuit characterizing the associated outlet by the combination of two electrical indications one of which depends on the value of said resistance and the other on the electromotive force of said supply, and a register including testing apparatus coupled to said selector switch and provided with first means for testing an engaged outlet with respect to one of said electrical indications to perform an operation when a desired indication is exhibited, second means responsive to the operation of said first means to test said engaged outlet with respect to the other of said electrical indications to perform an operation when a desired indication is exhibited, and third means coupled to said mechanism and responsive to the operation of said second means for arresting said wiper when an outlet is reached which exhibits the combination of indications corresponding to the desired outlet.

2. In an automatic signalling system, a circuit arrangement for the numerical adjustment by selective marking of a selector switch with simple motion, said switch having a wiper for successively engaging a plurality of outlets each having a marking contact and a mechanism for actuating said wiper, an outlet circuit coupled to each marking contact and including a voltage supply connected to said marking contact through a resistance, said outlet circuit characterizing the associated outlet by the combination of two electrical indications one of which depends on the value of said resistance and the other on the electromotive force of said supply, a register including testing apparatus coupled to said selector switch and provided with first means for testing an engaged outlet with respect to one of said electrical indications to perform an operation when a desired indication is exhibited, second means responsive to the operation of said first means to test said engaged outlet with respect to the other of said electrical indications to perform an operation when a desired indication is exhibited, and third means coupled to said mechanism and responsive to the operation of said second means for arresting said wiper when an outlet is reached which exhibits the combination of indications corresponding to the desired outlet, said testing apparatus being constituted by an electronic trigger circuit having two different electrically stable conditions, said trigger circuit comprising an electron discharge tube having a discharge path coupled to said wiper, said tube being non-conductive in the first of said conditions, said tube being conductive in the second of said conditions whereby a test current flows through the outlet circuit engaged by said wiper, a voltage comparison device for comparing in the first condition of said trigger circuit the electromotive force of said outlet with a comparison voltage adjusted in said register, said comparison device being responsive when said electromotive force has a predetermined value relative to said comparison voltage and applying a voltage to said trigger circuit such that it passes into said second condition, a network responsive to said second condition for comparing the value of the resistance in the outlet circuit with the value of a comparison resistance adjusted in said register, and means coupled to said network and responsive to a predetermined ratio of said resistance values to arrest said wiper.

References Cited in the file of this patent

UNITED STATES PATENTS

| Number | Name | Date |
|---|---|---|
| 2,354,667 | Deakin et al. | Aug. 1, 1944 |
| 2,380,950 | Deakin | Aug. 7, 1945 |
| 2,419,540 | Deakin | Apr. 29, 1947 |
| 2,444,065 | Pouliart | June 29, 1948 |
| 2,454,781 | Deakin | Nov. 30, 1948 |
| 2,454,809 | Kruithof et al. | Nov. 30, 1948 |
| 2,542,998 | Deakin | Feb. 27, 1951 |

FOREIGN PATENTS

| Number | Country | Date |
|---|---|---|
| 895,485 | France | Jan. 25, 1945 |